(12) United States Patent
Lalithambika et al.

(10) Patent No.: US 9,337,726 B2
(45) Date of Patent: May 10, 2016

(54) PWM/PFM CONTROLLER FOR USE WITH SWITCHED-MODE POWER SUPPLY

(71) Applicant: Intersil Americas LLC, Milpitas, CA (US)

(72) Inventors: Vinod Lalithambika, Cambridge (GB); Claudio Collura, Hertford (GB)

(73) Assignee: INTERSIL AMERICAS LLC, Milpitas, CA (US)

( * ) Notice: Subject to any disclaimer, the term of this patent is extended or adjusted under 35 U.S.C. 154(b) by 121 days.

(21) Appl. No.: 14/069,637

(22) Filed: Nov. 1, 2013

(65) Prior Publication Data

US 2015/0061624 A1  Mar. 5, 2015

Related U.S. Application Data

(60) Provisional application No. 61/870,708, filed on Aug. 27, 2013.

(51) Int. Cl.
*H02M 3/156* (2006.01)
*H02M 1/00* (2006.01)

(52) U.S. Cl.
CPC ...... *H02M 3/156* (2013.01); *H02M 2001/0025* (2013.01); *H02M 2001/0032* (2013.01); *Y02B 70/16* (2013.01)

(58) Field of Classification Search
CPC ... H02M 3/156; H02M 3/158; H02M 3/1588; H02M 2001/0025; H02M 2001/0032
See application file for complete search history.

(56) References Cited

U.S. PATENT DOCUMENTS

| | | | |
|---|---|---|---|
| 6,144,245 A * | 11/2000 | Balogh | H03K 17/161 |
| | | | 323/282 |
| 7,579,820 B2 | 8/2009 | Hane | |
| 8,106,642 B2 | 1/2012 | Chen et al. | |
| 8,406,014 B2 * | 3/2013 | Liu et al. | 363/21.02 |
| 8,976,546 B2 * | 3/2015 | Wang et al. | 363/21.12 |
| 2007/0164720 A1 | 7/2007 | Lalithambika et al. | |
| 2009/0279332 A1 * | 11/2009 | Grant et al. | 363/84 |
| 2010/0164455 A1 * | 7/2010 | Li et al. | 323/283 |
| 2011/0156684 A1 * | 6/2011 | da Silva | H02M 3/156 |
| | | | 323/284 |
| 2011/0286248 A1 | 11/2011 | Wang et al. | |
| 2014/0160809 A1 * | 6/2014 | Lin et al. | 363/21.16 |

* cited by examiner

*Primary Examiner* — Fred E Finch, III
*Assistant Examiner* — Rafael O. De Leon Domenech
(74) *Attorney, Agent, or Firm* — Vierra Magen Marcus LLP

(57) ABSTRACT

A controller, for use with an SMPS DC-DC converter, includes a PWM/PFM generator and a switch driver. The PWM/PFM generator simultaneously generates $CTRL_{PWM}$ and $CTRL_{PFM}$ signals in dependence on a CTRL signal. The switch driver generates a drive signal in dependence on both the $CTRL_{PWM}$ and $CTRL_{PFM}$ signals. The drive signal is used to control a power switch of the DC-DC converter. The CTRL signal is generated in dependence on a feedback signal indicative of an output voltage or current of the DC-DC converter. Regardless of the mode of the DC-DC converter, the $CTRL_{PWM}$ signal is used to control a peak current in an inductor of the DC-DC converter, and the $CTRL_{PFM}$ signal is used to control a switching frequency of the power switch. In certain embodiments, both the $CTRL_{PFM}$ and $CTRL_{PWM}$ signals are varied in dependence on the feedback signal when the DC-DC converter is in a PWM-PFM mode.

22 Claims, 17 Drawing Sheets

US 9,337,726 B2

PWM/PFM CONTROLLER FOR USE WITH SWITCHED-MODE POWER SUPPLY

PRIORITY CLAIMS

This application claims priority to U.S. Provisional Patent Application No. 61/870,708, filed Aug. 27, 2013, which is incorporated herein by reference.

BACKGROUND

Electronic devices often include a switched-mode power supply (SMPS) DC-to-DC converter, which can also be referred to herein simply as a DC-DC converter, to adjust (step-up or step-down) and stabilize voltage levels. For example, portable electronic devices, such as mobile phones, laptop computers and tablets often use such a DC-to-DC converter to adjust an input voltage level supplied by a battery to the appropriate level for powering circuitry within such devices. A boost DC-to-DC converter steps up an input voltage to a higher output voltage. A buck DC-to-DC converter steps down the input voltage so that the output voltage is lower than the input voltage.

In SMPS DC-to-DC converters, power loss results from either current conduction loss or switching loss in a power switch. Under heavy load conditions, current is high and thus conduction loss is the dominant factor. However, under light load conditions, current is low and thus switching loss is the dominant factor. To improve the light load efficiencies of a DC-to-DC converter, multiple modulation modes can be used to control the DC-to-DC converter at different output current (i.e., load) conditions. For example, in order to optimize the power efficiency for all load conditions, a SMPS DC-to-DC converter typically uses pulse width modulation (PWM) in heavy load conditions and pulse frequency modulation (PFM) in light load conditions.

SUMMARY

Certain embodiments of the present invention relate to a controller for use with a switch mode power supply DC-DC converter. Such a DC-DC converter can include an inductor, a diode, a power switch and a capacitor that collectively configure the DC-DC converter as either a boost converter or a buck converter. The controller, which can also be referred to as a PWM/PFM controller, includes a PWM/PFM generator and a switch driver. The PWM/PFM generator simultaneously generates a PWM control ($CTRL_{PWM}$) signal and a PFM control ($CTRL_{PFM}$) signal in dependence on a control (CTRL) signal. The switch driver generates a drive signal in dependence on both the $CTRL_{PWM}$ signal and the $CTRL_{PFM}$ signal. The drive signal is used to control the power switch of the DC-DC converter. The CTRL signal is generated in dependence on a feedback signal that is indicative of at least one of an output voltage or an output current of the DC-DC converter. The $CTRL_{PWM}$ signal is used to control a peak current in the inductor when the DC-DC converter is in a PFM mode as well as when the DC-DC converter is in a PWM mode (i.e., regardless whether the DC-DC converter is in the PFM mode or the PWM mode). The $CTRL_{PFM}$ signal is used to control a switching frequency of the power switch when the DC-DC converter is in the PFM mode as well as when the DC-DC converter is in the PWM mode (i.e., regardless whether the DC-DC converter is in the PFM mode or the PWM mode).

In accordance with certain embodiments, the controller is configured to ensure that there is no abrupt change in output power of the DC-DC converter, when the DC-DC converter transitions from the PWM mode to the PFM mode, and vice versa, and that the output power of the DC-DC converter changes monotonically with changes in the CTRL signal. More generally, the controller is configured to ensure that there is no abrupt change in the output voltage of the DC-DC converter, when the DC-DC converter transitions from one mode to another mode.

In accordance with certain embodiments, the PWM/PFM generator is adapted to maintain the $CTRL_{PWM}$ signal at a substantially constant level and vary the $CTRL_{PFM}$ signal in dependence on the feedback signal when the DC-DC converter is in the PFM mode, and thereby cause the peak current in the inductor to remain substantially constant when the DC-DC converter is in the PFM mode. Additionally, the PWM/PFM generator is adapted to maintain the $CTRL_{PFM}$ signal at a substantially constant level and vary the $CTRL_{PWM}$ signal in dependence on the feedback signal when the DC-DC converter is in the PWM mode, and thereby cause the switching frequency to remain substantially constant when the DC-DC converter is in the PWM mode. Further, the PWM/PFM generator can be adapted to vary both the $CTRL_{PFM}$ signal and the $CTRL_{PWM}$ signal in dependence on the feedback signal when the DC-DC converter is in a PWM-PFM mode, and thereby cause the switching frequency and the peak current in the inductor to both change when the DC-DC converter is in the PWM-PFM mode.

In accordance with certain embodiments, the PWM/PFM generator is adapted to: adjust the $CTRL_{PFM}$ signal monotonically in dependence on the CTRL signal, and maintain the $CTRL_{PWM}$ signal at a substantially constant level, when the CTRL signal is less than a threshold voltage $CTRL_1$; and adjust the $CTRL_{PWM}$ signal monotonically in dependence on the CTRL signal, and maintain the $CTRL_{PFM}$ signal at a substantially constant level, when the CTRL signal is greater than the threshold voltage $CTRL_1$.

In accordance with other embodiments, the PWM/PFM generator is adapted to: maintain the $CTRL_{PWM}$ signal at a substantially constant level when the CTRL signal is between a first threshold voltage $CTRL_1$ and a second threshold voltage $CTRL_2$; adjust the $CTRL_{PWM}$ signal monotonically in dependence on the CTRL signal when the CTRL signal is greater than the first threshold voltage $CTRL_1$; adjust the $CTRL_{PWM}$ signal monotonically in dependence on the CTRL signal when the CTRL signal is less than the second threshold voltage $CTRL_2$; maintain the $CTRL_{PFM}$ signal at a substantially constant level, which corresponds to a maximum switching frequency $F_{SWMAX}$, when the CTRL signal is greater than the first threshold voltage $CTRL_1$; adjust the $CTRL_{PFM}$ signal monotonically in dependence on the CTRL signal when the CTRL signal is between the first threshold voltage $CTRL_1$ and a third threshold voltage $CTRL_3$; and maintain the $CTRL_{PFM}$ signal at a substantially constant level when the CTRL signal is less than the third threshold voltage $CTRL_3$; wherein $CTRL_1 > CTRL_2 > CTRL_3$. In such embodiments, the controller causes the DC-DC converter to be: in the PWM mode when $CTRL > CTRL_1$; in the PFM mode when $CTRL_2 < CTRL < CTRL_1$; in a PWM-PFM mode when $CTRL_3 < CTRL < CTRL_2$; and in the PWM mode when $CTRL < CTRL3$. In such embodiments, the third threshold voltage $CTRL_3$ specifies a minimum switching frequency $F_{SWMIN}$, and thus, the third threshold voltage $CTRL_3$ can be selected to ensure that the minimum switching frequency $F_{SWMIN}$ is above audible frequencies to thereby achieve audio suppression. In accordance with certain embodiments, one or more of the above mentioned first, second and third threshold voltages can be changed to modify the frequency and peak current profile. For example, if $CTRL_2=CTRL_1$, then the resulting DC-DC converter would operating in the PWM mode when $CTRL>CTRL_1$, in PWM-PFM mode when $CTRL_3<CTRL<CTRL_1$, and in PWM mode when $CTRL<CTRL_3$. Other variations are also possible, and within the scope of an embodiment of the present invention.

More generally, the PWM/PFM generator achieves audio band suppression by ensuring that the switching frequency of the DC-DC converter does not fall below a minimum switching frequency $F_{SWMIN}$ that is above audible frequencies. This is important, for example, when the DC-DC converter is within a device, such as a mobile phone, that will be held close to a user's ear.

In accordance with certain embodiments, the switch driver of the controller includes a voltage controlled oscillator (VCO) that generates a clock signal in dependence on the $CTRL_{PFM}$ signal. Additionally, the switch driver includes circuitry that generates a drive terminating signal $T_{OFF}$ in dependence on the $CTRL_{PWM}$ signal. Further, the switch driver includes circuitry that generates the drive signal in dependence on the clock signal and the drive terminating signal $T_{OFF}$.

In accordance with certain embodiments, the PWM/PFM generator of the controller includes first and second multiplexers and one or more comparators. The first multiplexer receives at least two input signals and outputs one of the input signals as the $CTRL_{PWM}$ signal in dependence on a first select signal. The second multiplexer receives at least two input signals and outputs one of the input signals as the $CTRL_{PFM}$ signal in dependence on a second select signal. The comparator(s) generate the first and second select signals.

In accordance with certain embodiments, the switch driver of the controller includes a voltage controlled oscillator (VCO) that generates a clock signal in dependence on the $CTRL_{PFM}$ signal, and the switch driver uses the clock signal to generate the drive signal. In such embodiments, gain of the VCO adjusts gain of the DC-DC converter and thereby adjusts a phase margin and bandwidth of the DC-DC converter to stabilize of the DC-DC converter.

In certain embodiments, the switch driver of the controller includes circuitry that generates a clock signal in dependence on the $CTRL_{PFM}$ signal. The switch driver also includes circuitry that generates a first drive terminating signal in dependence on an input voltage to the DC-DC converter and the $CTRL_{PFM}$ signal, and circuitry that generates a second drive terminating signal in dependence on the $CTRL_{PWM}$ signal. Additionally, the switch driver includes circuitry that generates the drive signal in dependence on the first drive terminating signal, the second drive terminating signal, the clock, signal, a current sense signal, and a current sense blanking signal. The current sense signal is generated by a current sense circuit of the DC-DC converter. The current sense blanking signal selectively causes the current sense signal to not be generated, or to be ignored, during blanking periods. The clock signal controls the switching frequency of the DC-DC converter.

Embodiments of the present invention are also directed to SMPS DC-DC converters that include one of the controllers summarized above. Such a DC-DC converter can be a boost converter, a buck, converter, a buck-boost converter, or a fly-back converter but is not limited thereto.

Further, embodiments of the present invention are also directed to methods for use with a switch mode power supply DC-DC. For example, such a method can include generating a control (CTRL) signal in dependence on a feedback signal that is indicative of an output voltage or output current of the DC-DC converter. Additionally, the method includes simultaneously generating a PWM control ($CTRL_{PWM}$) signal and a PFM control ($CTRL_{PFM}$) signal in dependence on the CTRL signal regardless of a mode of the DC-DC converter. Further, the method includes generating a drive signal in dependence on both the $CTRL_{PWM}$ signal and the $CTRL_{PFM}$ signal, and controlling the power switch of the DC-DC converter in dependence on the drive signal. The method can also include using the $CTRL_{PWM}$ signal to control a peak current in the inductor regardless of the mode of the DC-DC converter, and using the $CTRL_{PFM}$ signal to control a switching frequency of the power switch regardless of the mode of the DC-DC converter. Such a method can be used to ensure that there is no abrupt change in output power of the DC-DC converter, when the DC-DC converter transitions from one mode to another mode, and so ensure that the output power of the DC-DC converter changes monotonically with changes in the CTRL signal.

In certain embodiments, a method can include: operating the DC-DC converter in a PWM mode when CTRL is greater than a first threshold voltage $CTRL_1$; operating the DC-DC converter in a PFM mode when CTRL is greater than a second threshold voltage $CTRL_2$, and less than $CTRL_1$; operating the DC-DC converter in a PWM-PFM mode when CTRL is greater than a third threshold voltage $CTRL_3$ and less than $CTRL_2$; and operating the DC-DC converter in the PWM mode when CTRL is less than $CTRL_3$.

A method can also include adjusting the $CTRL_{PFM}$ signal monotonically in dependence on the CTRL signal, and maintaining the $CTRL_{PWM}$ signal at a substantially constant level, when the DC-DC converter is in the PFM mode. Further, the method can include adjusting the $CTRL_{PWM}$ signal monotonically in dependence on the CTRL signal, and maintaining the $CTRL_{PFM}$ signal at a substantially constant level, when the DC-DC converter is in the PWM mode. Additionally, the method can include adjusting both the $CTRL_{PFM}$ signal and the $CTRL_{PWM}$ signal monotonically in dependence on the CTRL signal when the DC-DC converter is in the PWM-PFM mode.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

The inventive concepts are explained herein with an example embodiment of a boost DC-DC converter. However these concepts could be applied to any SMPS DC-to-DC converter that switches between a PWM mode and a PFM mode, including, but not limited to boost DC-DC converters and buck DC-DC converters.

Figure 1:
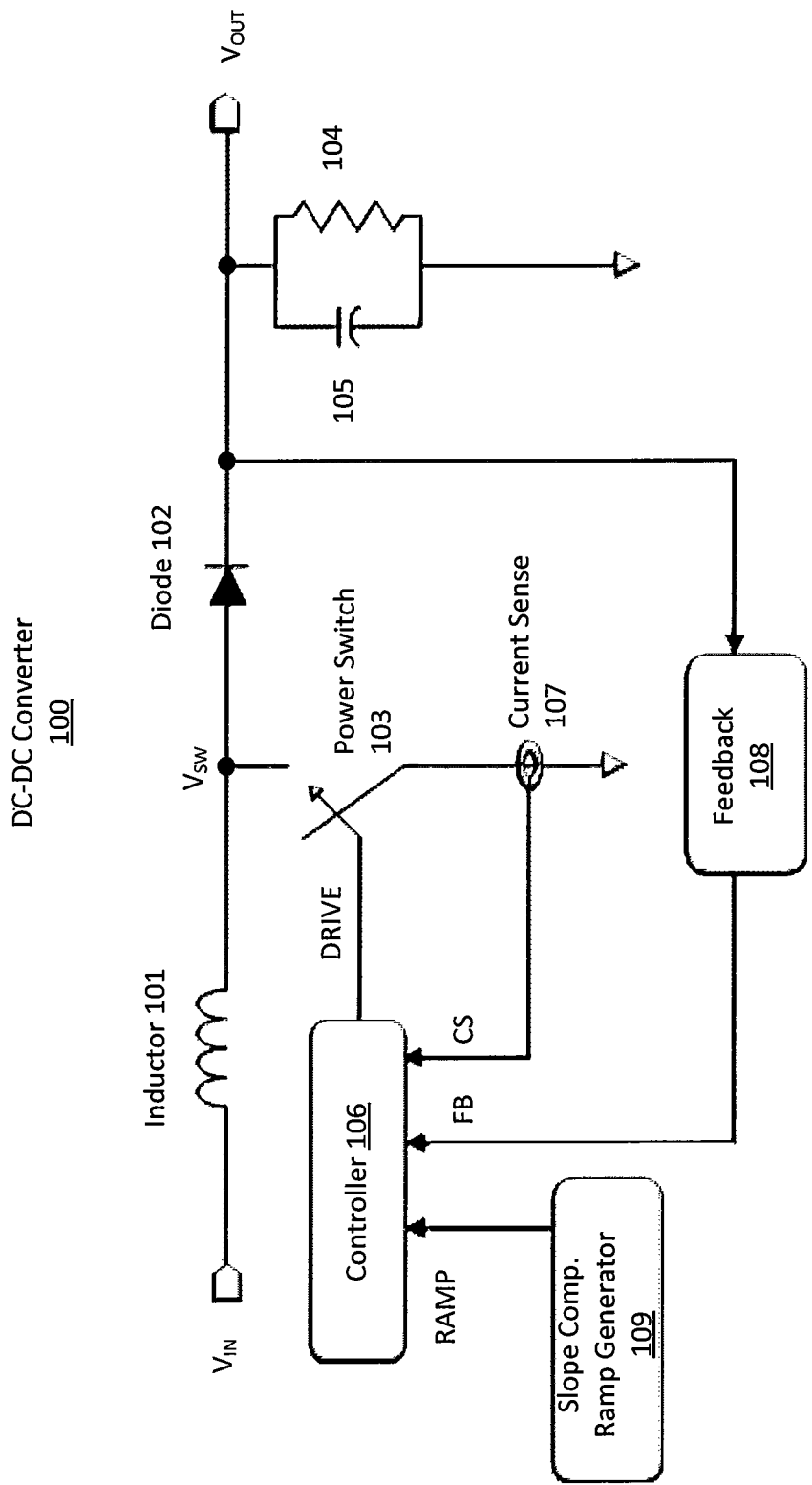
FIG. 1 illustrates a boost SMPS DC-DC converter that includes a PWM/PFM controller, according to an embodiment.

FIG. 1 illustrates a boost SMPS DC-to-DC converter 100 that includes a PWM/PFM controller 106 (which can also be referred to herein simply as the controller 106), according to an embodiment. Referring to FIG. 1, the boost SMPS DC-to-DC converter is 100 also shown as including an inductor 101, a diode 102, a power switch 103, a resistor 104, a capacitor 105, a current sense circuit 107, a feedback circuit 108 and a slope compensation ramp generator 109. The boost SMPS DC-DC converter 100 steps up an input voltage $V_{IN}$ to an output voltage $V_{OUT}$. The feedback circuit 108 is used to monitor and control the output voltage $V_{OUT}$, and more specifically, generates a feedback signal FB that is proportional to the output voltage $V_{OUT}$ of the DC-DC converter 100. The feedback circuit 108 can be implemented, e.g., using a simple resistor divider circuit, but is not limited thereto. The current sense circuit 107 produces a current sense signal CS that is a voltage signal proportional to the current in the inductor 101 while the switch 103 is closed (i.e., turned on). The slope compensation ramp generator 109 generates a compensation ramp signal RAMP that is provided to, and used by, the controller 106. In an embodiment, the controller 106 determines the switching frequency $F_{SW}$ and on time $T_{ON}$ of the DRIVE signal using the feedback signal FB, the current sense signal CS and the compensation ramp signal RAMP. In an alternative embodiment, an additional current sense circuit (not shown) can sense the current at the output of the DC-DC converter 100, and the feedback signal FB can be proportional to the output current of the DC-DC converter 100, rather than being proportional to the output voltage $V_{OUT}$. In another embodiment, the DC-DC converter does not include the slope compensation ramp generator 109, but still uses inner and outer feedback loops, exemplary details of which are provided below. In still another embodiment, the DC-DC converter only utilizes a voltage mode outer feedback loop, exemplary details of which are provided below.

A boost SMPS DC-to-DC converter, such as the one shown in FIG. 1, operates by storing energy in the inductor 101 and releasing the stored energy through the rectifying diode 102. More specifically, when the DRIVE signal closes (i.e., turns on) the power switch 103, the voltage across the inductor 101 increases to approximately the input voltage $V_{IN}$, and energy is stored in the inductor 101. The amount of energy stored in the inductor 101 is a function of the input voltage $V_{IN}$, the inductance value of the inductor 101, and the duration that the power switch 103 is closed (i.e., turned on). While the power switch 103 is closed (i.e., turned on), the rectifying diode 102 is reversed-biased. When the DRIVE signal opens (i.e., turns off) the power switch 103, the energy that was stored in the inductor 101 is released to the output through the rectifying diode 102. The capacitor 105 filters the pulsating current, allowing DC current to flow into the load connected to the output.

In PWM mode, the power switch 103 is switched at a substantially constant switching frequency ($F_{SW}$), and therefore a substantially constant switching period, but the duty cycle of the power switch 103 is varied. Duty cycle refers to the fraction (often expressed as a percentage) of the switching period during which the power switch 103 is closed (i.e., turned on). For example, a PWM switching scheme may have a switching frequency of 100 kHz and therefore a switching period of 10 µs. Hence, for a duty cycle of 30%, the power switch 103 would be closed (i.e., turned on) for 3 µs and open (i.e., turned off) for 7 µs of each switching period. When in PWM mode, the output voltage ($V_{OUT}$) is regulated based on the feedback signal FB and the current sense signal CS by adjusting the duty cycle of the power switch 103, but maintains a substantially constant switching frequency. Explained another way, during the PWM mode, the switching frequency ($F_{SW}$) is substantially constant, and the peak current in the inductor ($I_{LPEAK}$) is varied to regulate the output voltage ($V_{OUT}$).

For example, a PFM switching scheme may turn on the power switch for 5 µs of each switching period, but vary the switching frequency between 40 kHz and 130 kHz. A switching frequency of 40 kHz would correspond to a switching period of 25 µs, and therefore, a duty cycle of 20%, whereas a switching frequency of 130 kHz would correspond to a switching period of 7.7 µs and therefore a duty cycle of 65%. Hence, when in PFM mode, the output voltage ($V_{OUT}$) is regulated based on the feedback signal FB and the current sense signal CS by adjusting the frequency and period of the power switch 103, but the power switch is closed (i.e., turned on) for the same duration during each switching period. Explained another way, during the PFM mode, the peak current in the inductor ($I_{LPEAK}$) is substantially constant, and the switching frequency ($F_{SW}$) is varied to regulate the output voltage ($V_{OUT}$).

Still referring to FIG. 1, there are two feedback loops, including an outer voltage mode feedback loop and an inner current mode feedback loop. The outer voltage mode feedback loop includes the $V_{SW}$ node, the diode 102, the $V_{OUT}$ node, the feedback circuit 108, the controller 106 and the power switch 103. The feedback signal FB is a feedback signal generated within the outer voltage mode feedback loop. The inner current mode feedback loop includes the VSW node, the power switch 103, the current sense circuit 107 and the controller 106. The current sense signal CS is a feedback signal generated within the inner current mode feedback loop. While the power switch is open (i.e., turned off), the voltage at the $V_{SW}$ node charges up due to parasitic capacitances. When the power switch is closed (i.e., turned on) the $V_{SW}$ node capacitances discharges, which could cause a peak voltage in the current sense signal CS that is indicative of a current actually higher than the current through the inductor 101. Accordingly, the inner current mode feedback loop is opened during a brief blanking period that is initiated each time the power switch is closed (i.e., turned on). Such a blanking period can be controlled using a $CS_{BLANK}$ signal.

Figure 2:
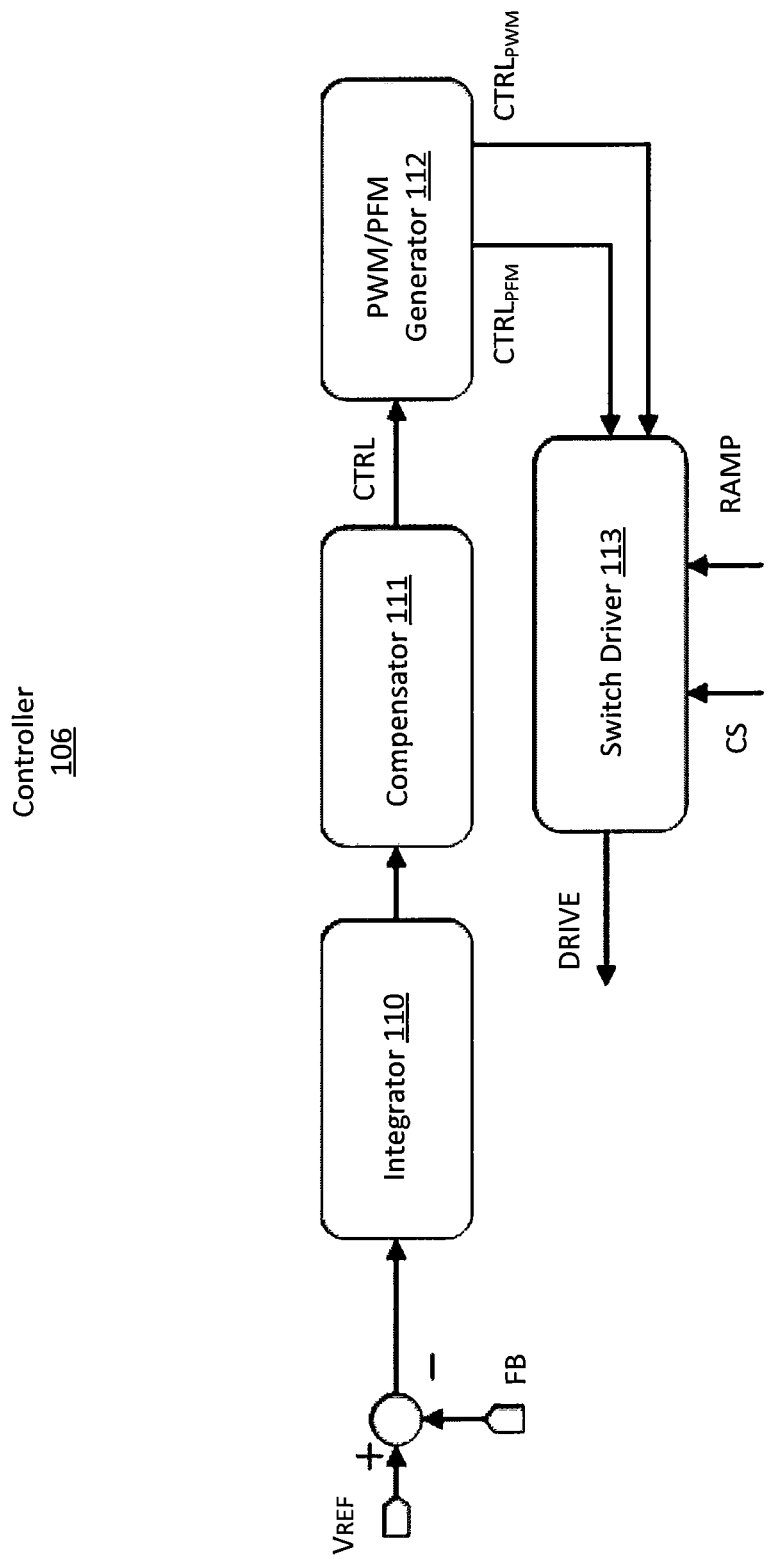
FIG. 2 illustrates additional details of the PWM/PFM controller shown in FIG. 1, according to an embodiment.

FIG. 2 illustrates additional details of the controller 106 of FIG. 1, according to an embodiment. Referring to FIG. 2, the controller 106 is shown as including an integrator 110, a compensator 111, a PFM/PWM generator 112 and a switch driver 113. The integrator 110 causes the feedback signal FB to be equal to a reference voltage $V_{REF}$, and thus, indirectly controls the output voltage $V_{OUT}$. The compensator 111 generates a control signal CTRL, which is provided to the PFM/PWM generator 112 and used to improve the phase margin and/or bandwidth of the control loop. More specifically, based on the control signal CTRL generated by the compensator 111, the PWM/PFM generator 112 controls the on-time $T_{ON}$ and the switching frequency $F_{SW}$ of the DRIVE signal that controls with switching of the power switch 103. While shown as separate blocks in FIG. 2, the integrator 110 and the compensator 111 can be implemented collectively, e.g., using the circuit shown in FIG. 16, but is not limited thereto. Further, it is noted that the control signal CTRL is sometimes referred to interchangeably simply as the CTRL signal.

Figure 3:
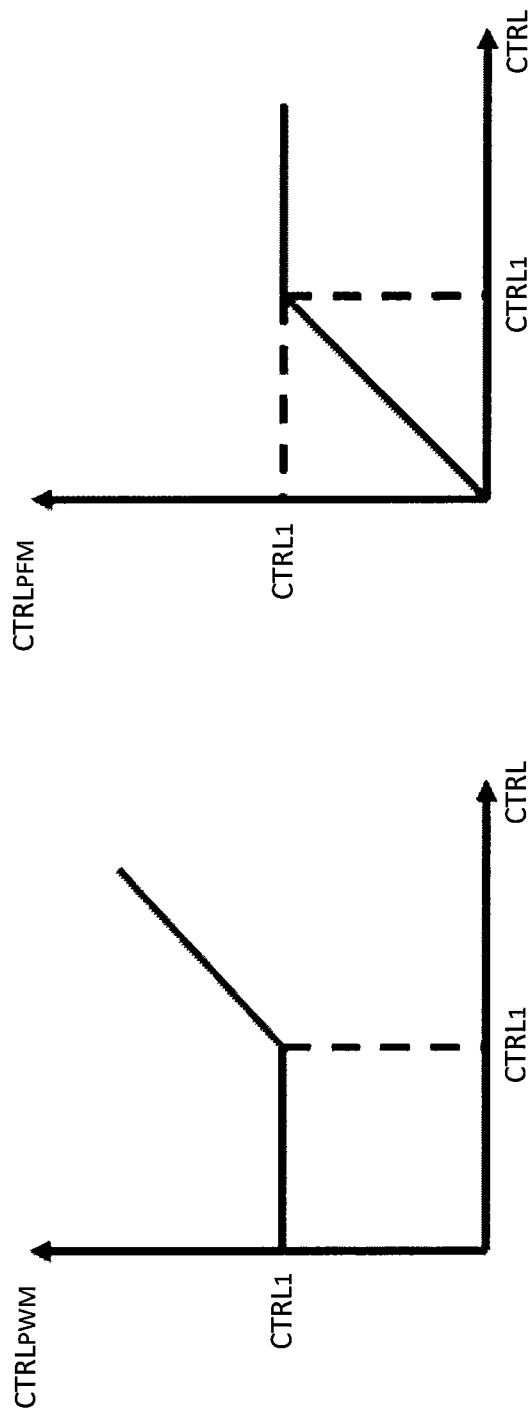
FIGS. 3 and 4 are used to illustrate additional details of the PWM/PFM generator shown in FIG. 2, according to an embodiment.

As shown in FIG. 3, the PWM/PFM generator 112 creates two control signals, including: a PFM control signal $CTRL_{PFM}$ that is used to generate the switching frequency $F_{SW}$; and a PWM control signal $CTRL_{PWM}$ that is used to determine the on-time $T_{ON}$. $CTRL_1$ is a threshold voltage above which the $CTRL_{PWM}$ varies in proportion to the control voltage and below which it is fixed at the threshold value. $CTRL_{PFM}$ is fixed at the threshold value of $CTRL_1$ when CTRL voltage is above $CTRL_1$ and varies with CTRL voltage below $CTRL_1$. Thus, the DC-DC converter will be in PWM mode above the threshold voltage $CTRL_1$ and in PFM mode below the threshold voltage $CTRL_1$.

Figure 4:
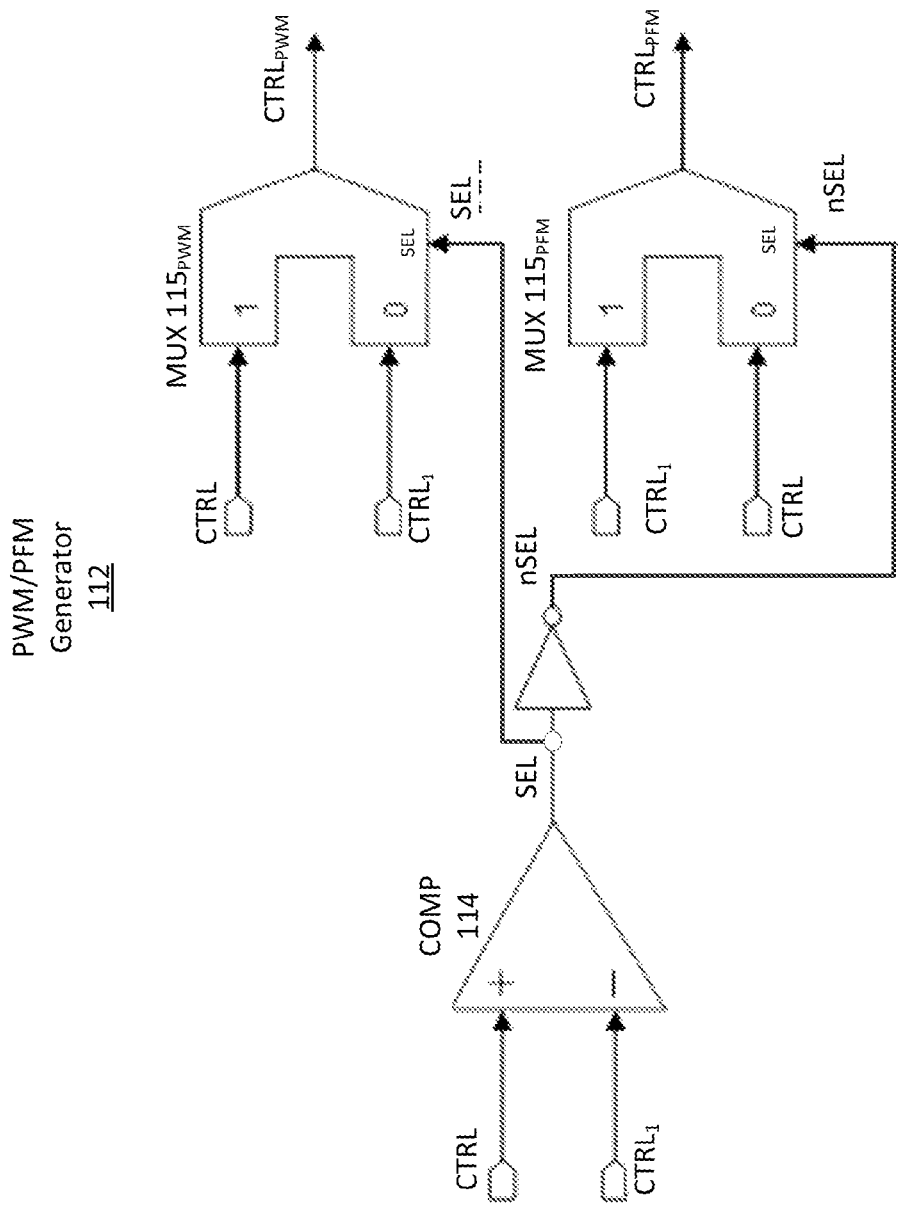

Referring to FIG. 4, in an embodiment, the two control signals $CTRL_{PWM}$ and $CTRL_{PFM}$ are created using a comparator 114 and analogue multiplexers (MUXes) $115_{PWM}$ and $115_{PFM}$. More specifically, the control signal CTRL (generated by the compensator 111) is provided to the non-inverting (+) input of the comparator 114, and the threshold voltage $CTRL_1$ is provided to the inverting (-) input of the comparator 114. When the control signal CTRL is greater than the threshold voltage $CTRL_1$, the output of the comparator 114, which is a select (SEL) signal, will be binary high (1), and the inverted select (nSEL) signal will be binary low (0). The SEL signal is used to select which of the two inputs to the MUX $115_{PWM}$ is output by the MUX $115_{PWM}$; and the nSEL signal is used to select which of the two inputs to the MUX $115_{PFM}$ is output by the MUX $115_{PFM}$. This allows for a seamless transition from the PWM mode to the PFM mode, wherein the output power that is output by the DC-DC converter changes monotonically with the control signal CTRL.

Figure 5:
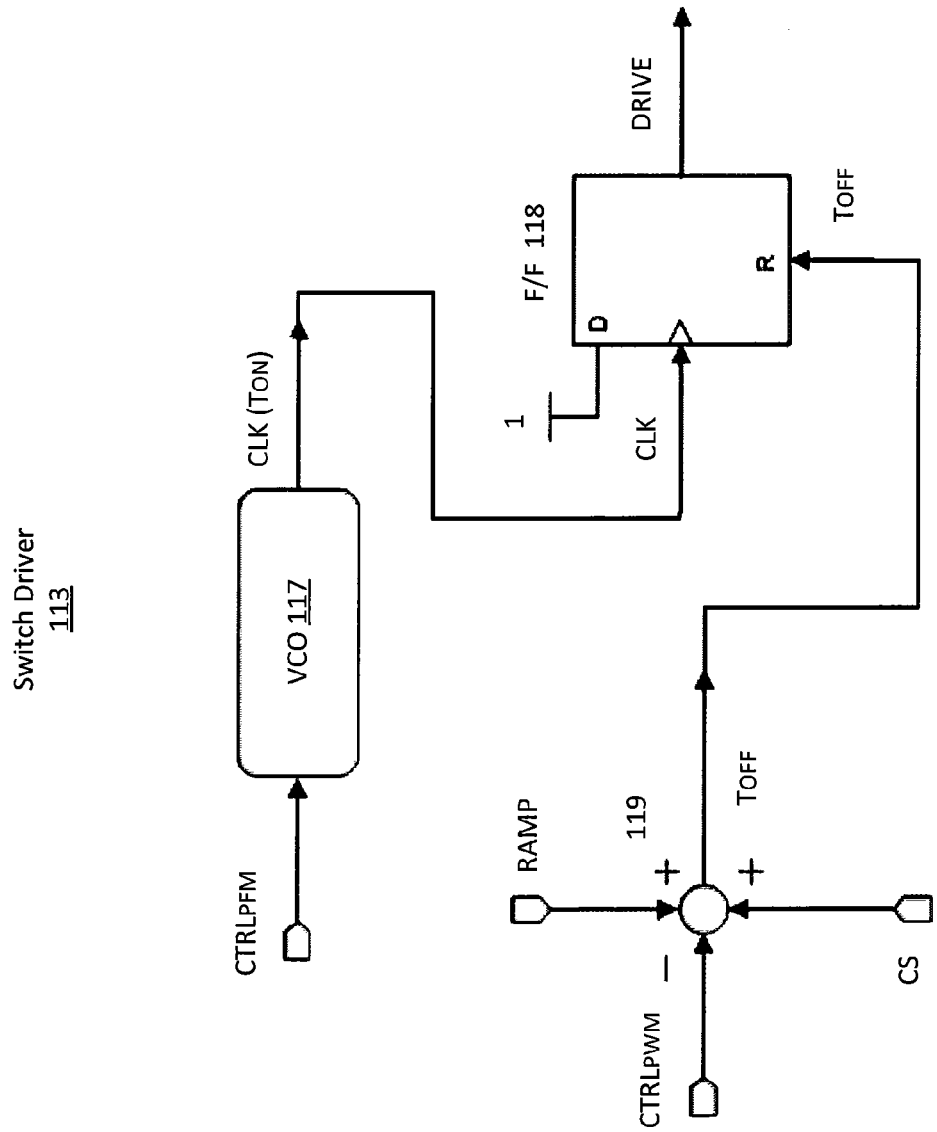
FIG. 5 illustrates details of the switch driver shown in FIG. 2, according to an embodiment.
Figure 6:
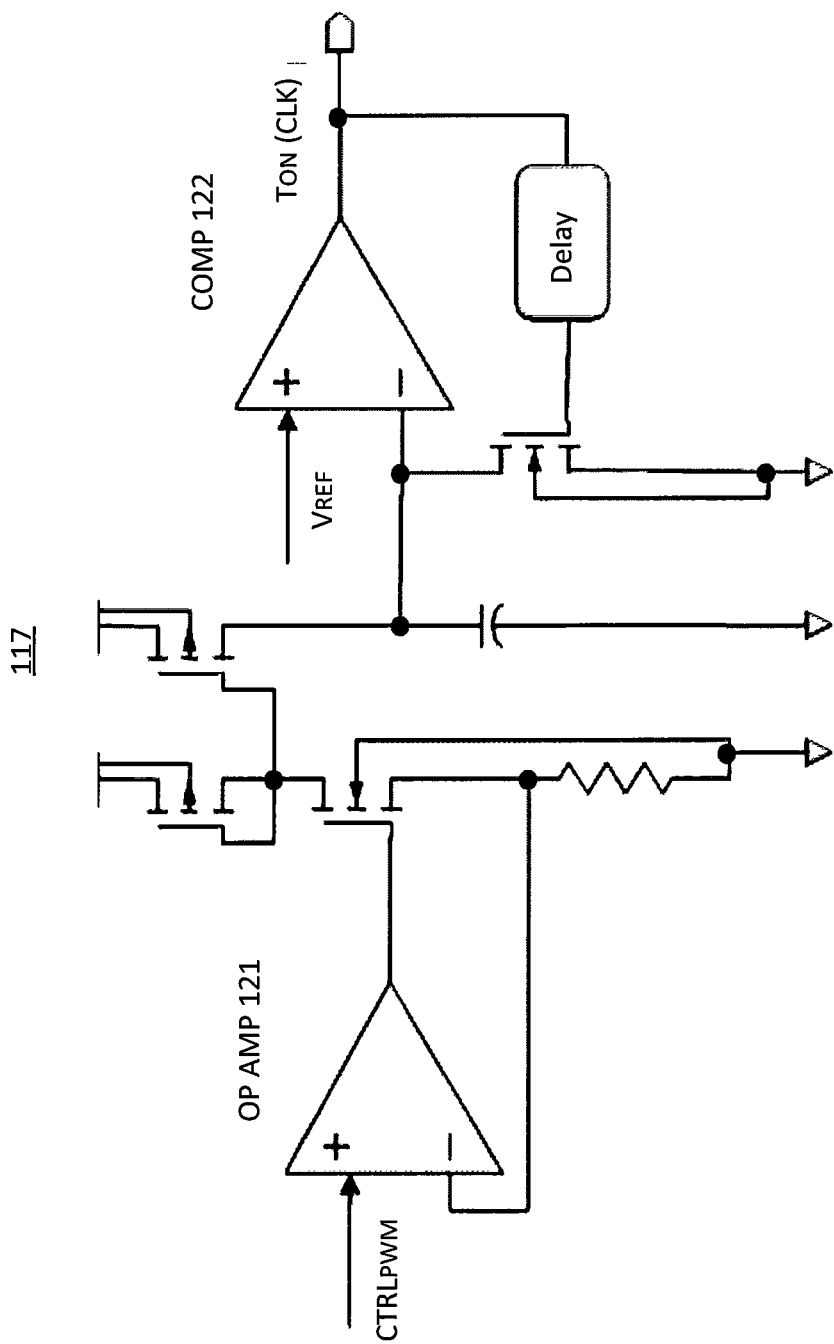
FIG. 6 illustrates an exemplary implementation of the voltage controlled oscillator (VCO) shown in FIG. 5.
Figure 7:
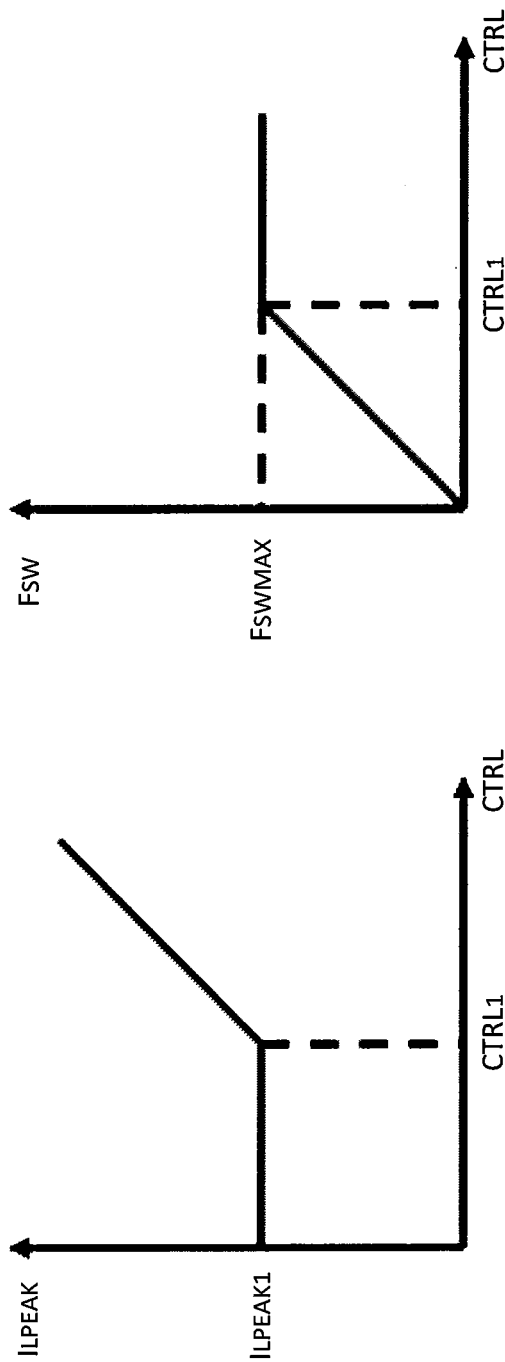
FIG. 7 illustrates how a switching frequency ($F_{SW}$) and a peak inductor current ($I_{LPEAK}$) van with a control signal CTRL, in accordance with an embodiment.

FIG. 5 illustrates details of the switch driver 113, shown in FIG. 2, according to an embodiment. As shown in FIG. 5, the $CTRL_{PFM}$ signal is provided to an input of a voltage controlled oscillator (VCO) 117 to generate the clock CLK signal, which can also be referred to as the $T_{ON}$ signal. An exemplary implementation of the VCO 117 is shown in FIG. 6, but embodiments of the present invention are not limited to use of the VCO shown in FIG. 6. Still referring to FIG. 5, the $CTRL_{PWM}$ signal specifies the peak current in the inductor ($I_{LPEAK}$) using a summing amplifier 119 and a D flip-flop 118. More specifically, the summing amplifier 119 produces a drive terminating signal $T_{OFF}$, which can also be referred to as a power switch turn-off signal, by summing the slope compensation ramp signal RAMP and the current sense signal CS and subtracting the $CTRL_{PWM}$ signal from the sum. The D-input of the D flip-flop 118 is held binary high (1), the clock signal CLK (generated by the VCO 117) is provided to the clock (CLK) input of the D flip-flop 118, and the drive terminating signal $T_{OFF}$ is provided to the reset (R) input of the D flip-flop 118. The output of the D flip-flop 118 is the DRIVE signal that is used to control the power switch 103. This results in a PWM/PFM control system where the switching frequency ($F_{SW}$) and peak inductor current ($I_{LPEAK}$) varies with the control signal CTRL, as shown in FIG. 7.

The above described PWM/PFM controller 106 advantageously improves efficiency at light loads, provides seamless transitions between PWM and PFM modes with no abrupt spikes in the output voltage $V_{OUT}$, and provides for low ripple in the PFM mode. Additionally, the output power of a SMPS DC-to-DC converter, which includes the PWM/PFM controller 106, changes monotonically with the control signal CTRL.

Figure 8:
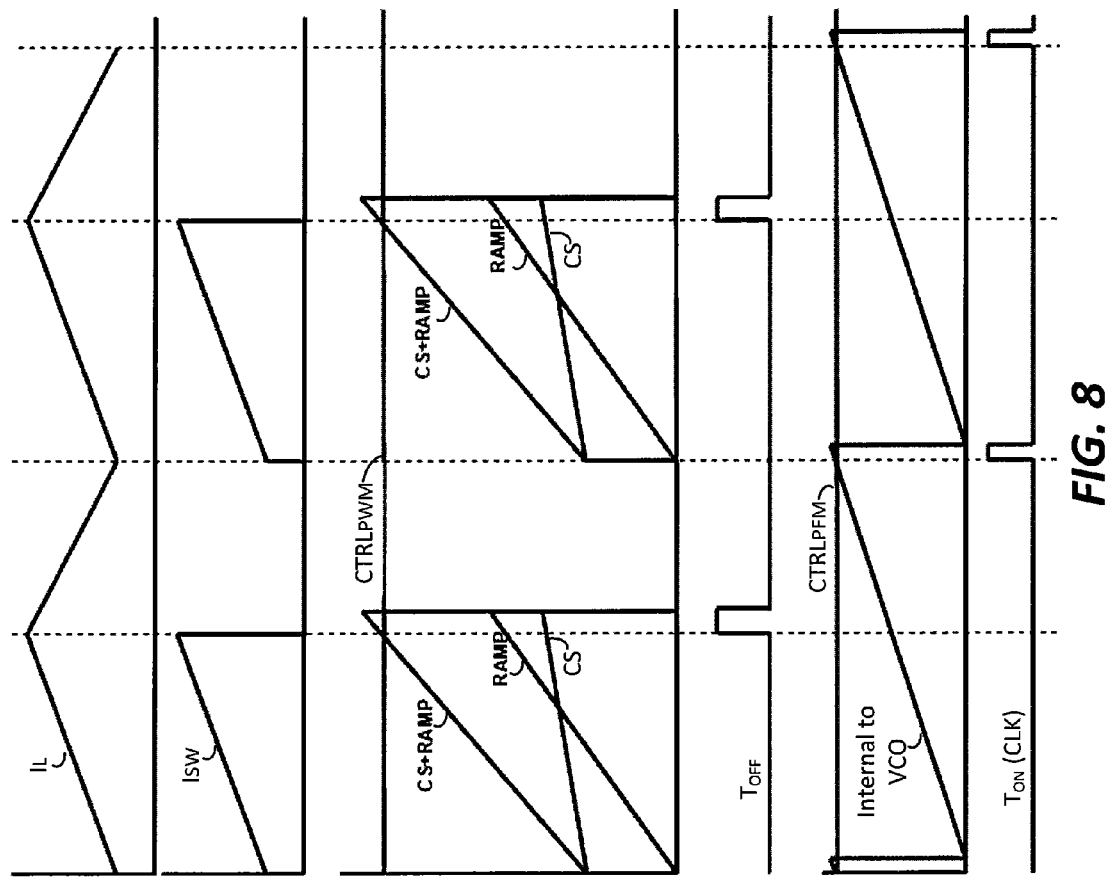
FIG. 8 is an exemplary timing diagram for the SMPS DC-DC converter shown in FIG. 1 and described in additional detail with reference to FIGS. 2-7.

FIG. 8 is an exemplary timing diagram for the SMPS DC-DC converter 100 shown in FIG. 1 and described in additional detail with reference to FIGS. 2-7. Table 1, shown below, specifies parameters corresponding to the symbols shown in FIG. 8.

TABLE 1

| Symbol | Parameter |
| --- | --- |
| $I_L$ | Inductor current |
| $I_{SW}$ | Switch current |
| $CTRL_{PWM}$ | Control that determines peak current in inductor |
| CS | Voltage at current sense |
| RAMP | Compensation ramp |
| $CTRL_{PFM}$ | Control that determines switching frequency |
| $T_{OFF}$ | Signal when high turns the DRIVE off |
| $T_{ON}$ | Periodic signal that turns the DRIVE on |

In accordance with specific embodiments, the PWM/PFM controller 106 is configured to provide audio band suppression (ABS) by ensuring that the switching frequency of the DRIVE signal is above the audible frequencies (i.e., above 20 kHz). This is to avoid any audible noise coming from the controller 106, which is especially important when the controller 106 is included in a device, such as a mobile phone, which will be held close to a user's ear. More specifically, by further modifying the frequency and peak current profile, the minimum switching frequency can be pushed high enough to achieve audio band suppression.

Figure 9:
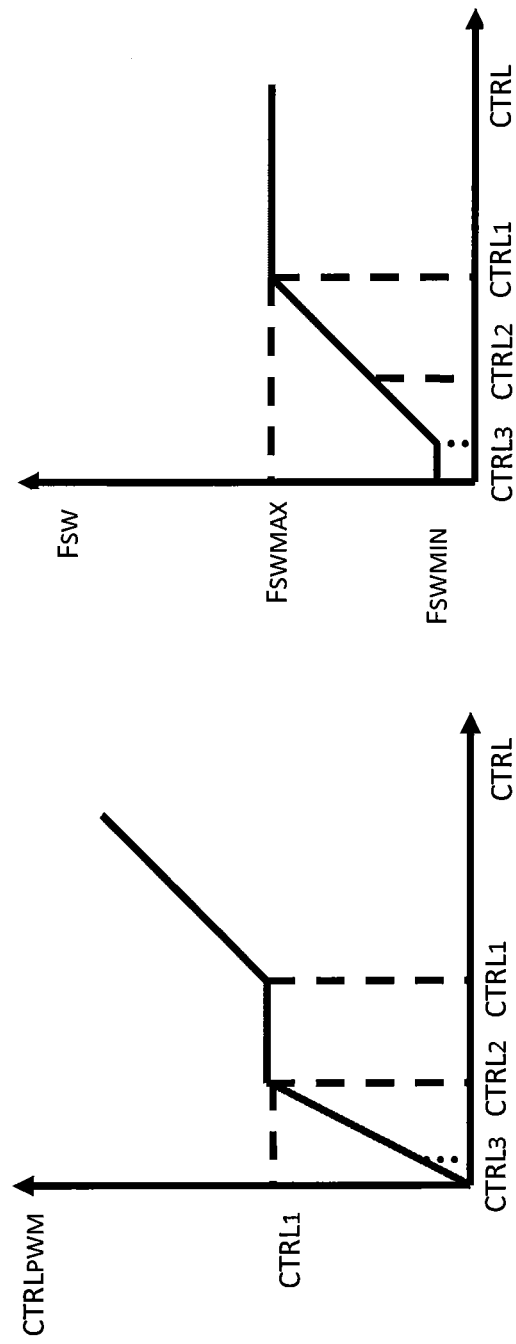
FIGS. 9 and 10 are used to illustrate additional details of the PWM/PFM generator shown in FIG. 2, according to an alternative embodiment that provides audio band suppression.

In the profile shown in FIG. 9, when $CTRL>CTRL_1$ the system operates at its maximum switching frequency ($F_{SWMAX}$). The control of power in this region is achieved by varying the peak inductor current. When $CTRL_2<CTRL<CTRL_1$ the system works with a substantially constant peak inductor current and a variable frequency, by adjusting the $CTRL_{PFM}$ signal. Thus, when $CTRL_2<CTRL<CTRL_1$ the DC-DC converter is in its PFM mode. As the switching frequency ($F_{SW}$) is reduced there is a reduction in the switching losses and hence improved power efficiency. When $CTRL<CTRL_3$ the switching frequency is limited to a value, i.e., a minimum switching frequency ($F_{SWMIN}$), that is above audible frequencies (i.e., above 20 kHz). Control of power is achieved in this range by varying the peak inductor current by adjusting the $CTRL_{PWM}$ signal. Thus, when $CTRL<CTRL_3$ the DC-DC converter is in its PWM mode. When $CTRL_3<CTRL<CTRL_2$ both the switching frequency and peak inductor current are reduced. Thus, when $CTRL_3<CTRL<CTRL_2$ the DC-DC converter is in what will be referred to as a PWM-PFM mode, since during this mode, the peak inductor current is varied by adjusting the $CTRL_{PWM}$ signal, and the switching frequency ($F_{SW}$) is varied by adjusting the $CTRL_{PFM}$ signal. Depending upon implementation, when $CTRL=CTRL_1$, the DC-DC converter can either be in the PWM mode or the PFM mode; when $CTRL=CTRL_2$, the DC-DC converter can either be in PFM mode or PWM-PFM mode; and when $CTRL=CTRL_3$, the DC-DC converter can either be in PWM-PFM mode, or in PWM mode.

Figure 10:
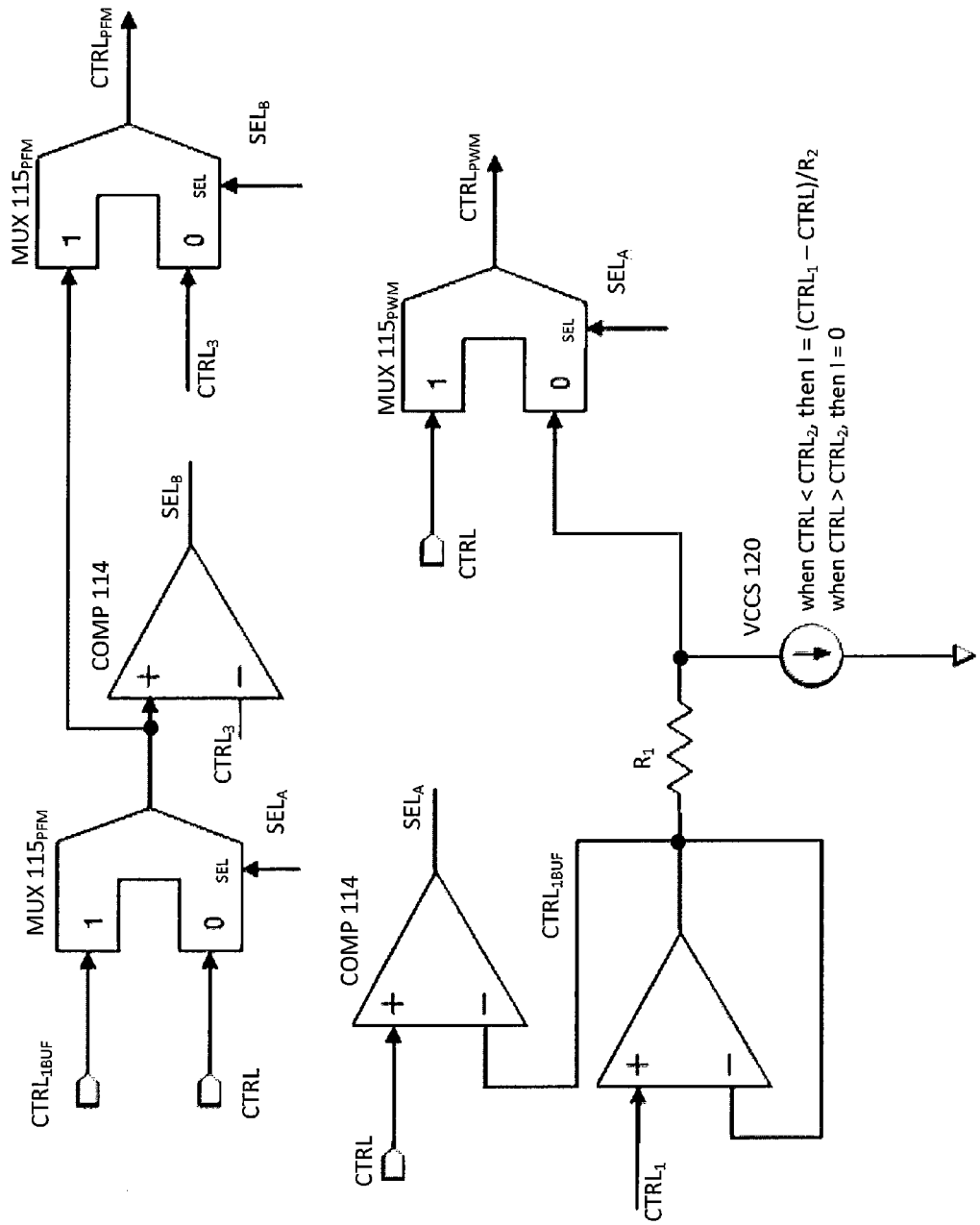
Figure 11:
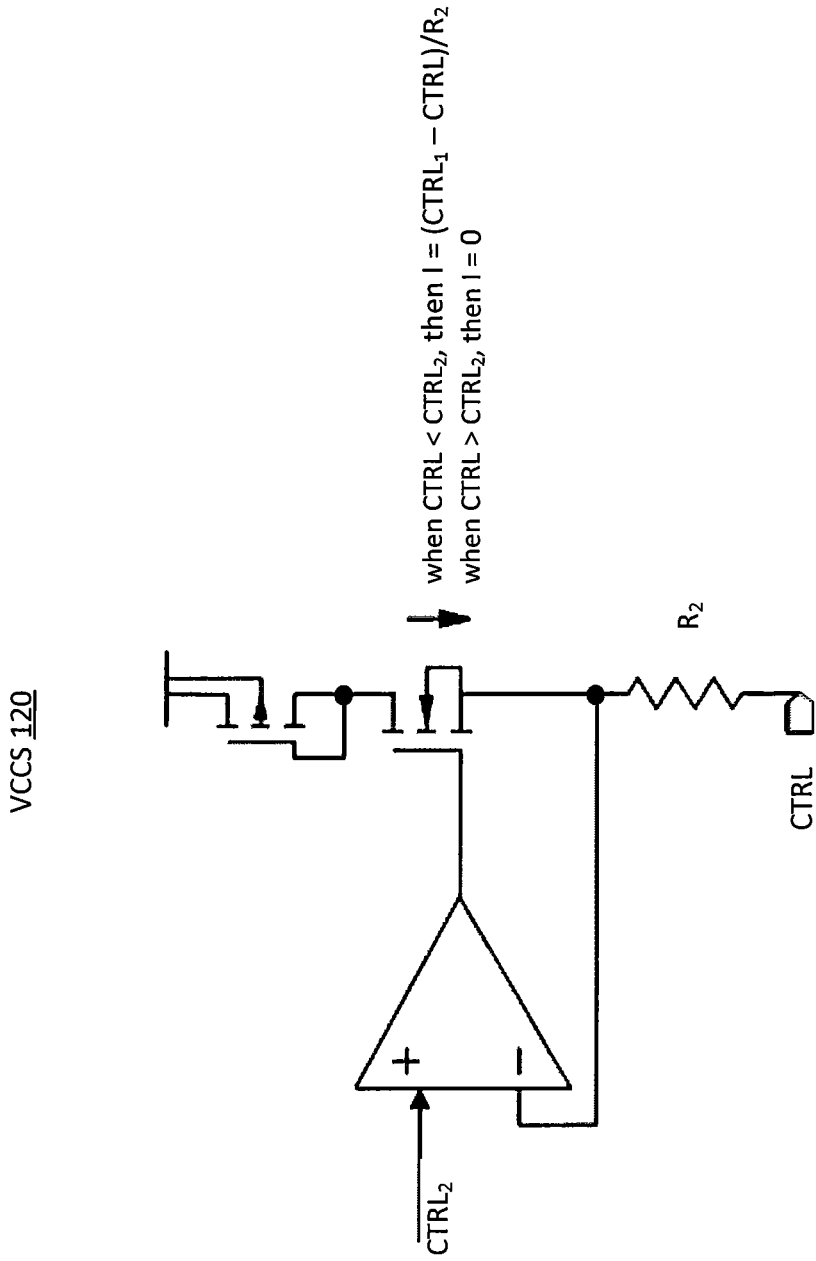
FIG. 11 illustrates an embodiment of the voltage controlled current source (VCCS) shown FIG. 10.

FIG. 10 illustrates an embodiment of the PWM/PFM controller 106, which can be used to achieve the profiles shown in FIG. 9. FIG. 11 shows an embodiment of the voltage controlled current source (VCCS) 120 shown FIG. 10, but embodiments of the present invention are not limited to use of the VCCS 120 shown in FIG. 11. In the embodiments of FIGS. 10 and 11, $R_1/R_2=CTRL_1/CTRL_2$. The PWM/PFM controller 106 shown in FIG. 10 advantageously provides audio band suppression, while still controlling the output power by changing the on-time.

Figure 12:
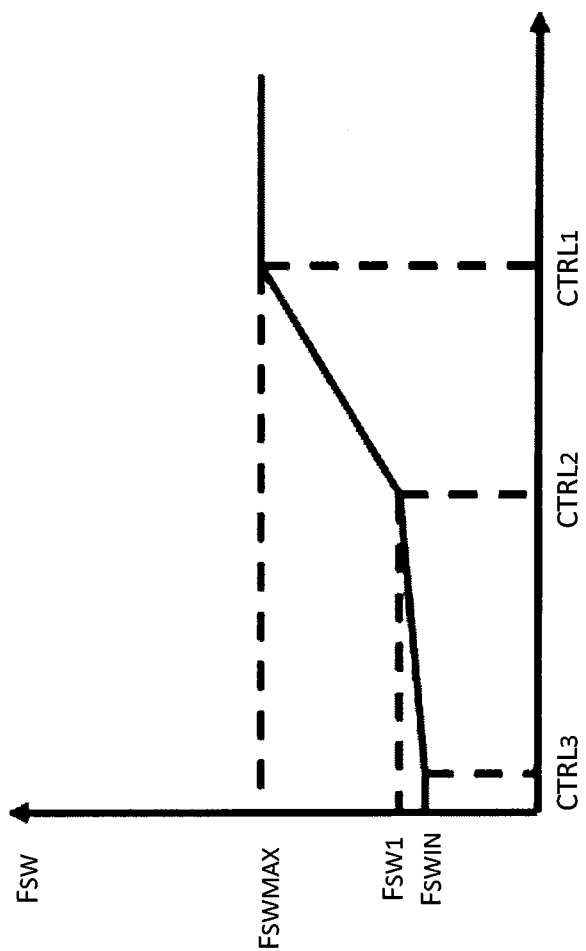
FIGS. 12 and 13 are used to illustrate details of a VCO, according to an embodiment, that can be used produce a frequency profile that can be used to change the efficiency profile with changes in the load that is powered by the DC-DC converter.
Figure 13:
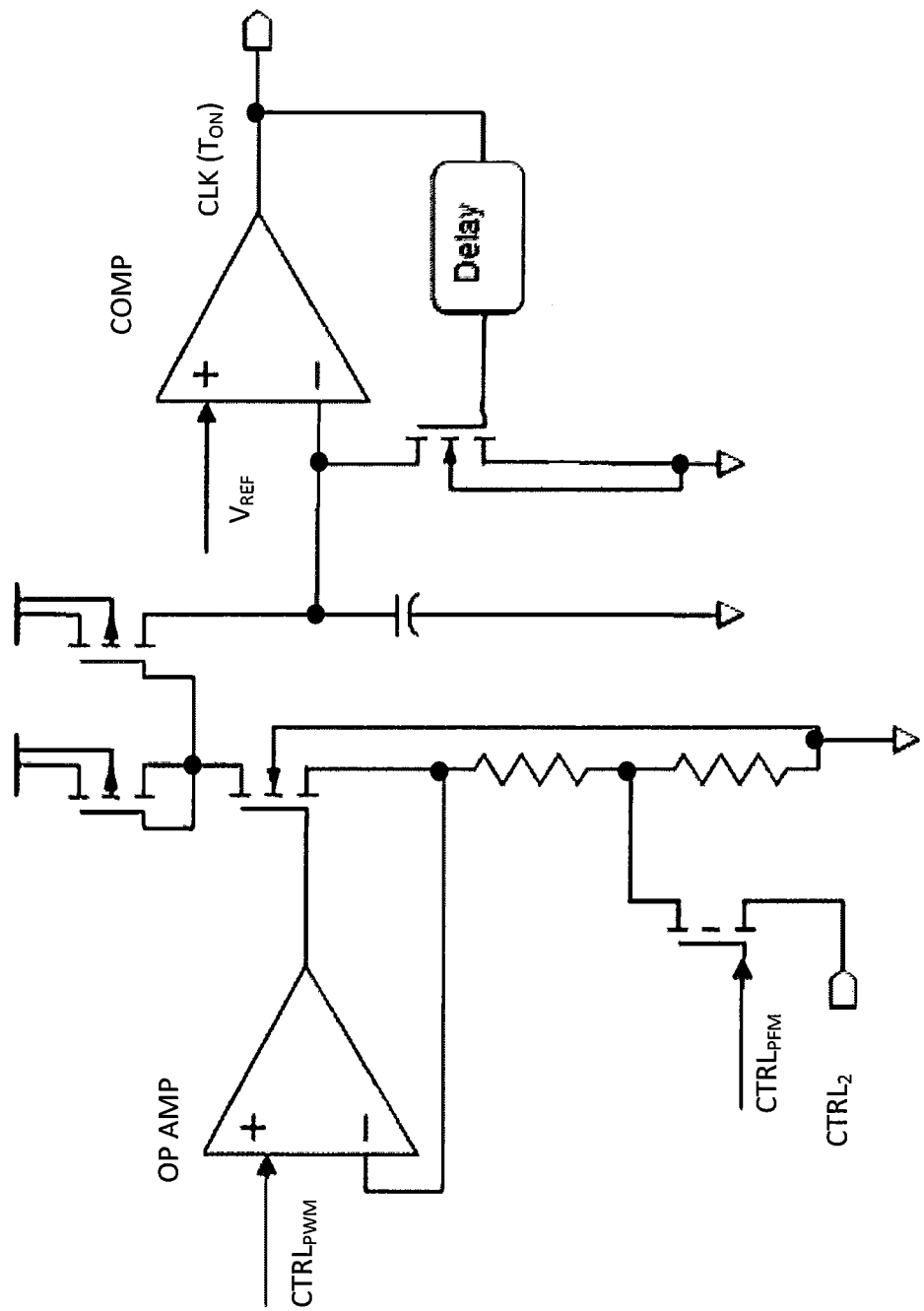

In accordance with specific embodiments, the VCO 117 of the switch driver 113 can generate different frequency profiles. An embodiment of a frequency profile is shown in FIG. 12. FIG. 13 illustrates an embodiment of the VCO 117 that could generate the frequency profile shown in FIG. 12, but embodiments of the present invention are not limited to use of the VCO shown in FIG. 13. Where a VCO generates a frequency profile, such a VCO can be referred to as a frequency profiler.

An advantage of using the frequency profiler is that reduced gain at low powers may lead to more stable control at low powers. Additionally, the frequency profiler can be adapted to change the efficiency profile with the load that is powered by the SMPS DC-DC converter. As an example, one could quickly reduce the frequency from a maximum switching frequency ($F_{SWMAX}$) to an intermediate switching frequency and then slowly reduce the frequency from the intermediate switching frequency to the minimum switching frequency ($F_{SWMIN}$) that is above the audio band.

Figure 14:
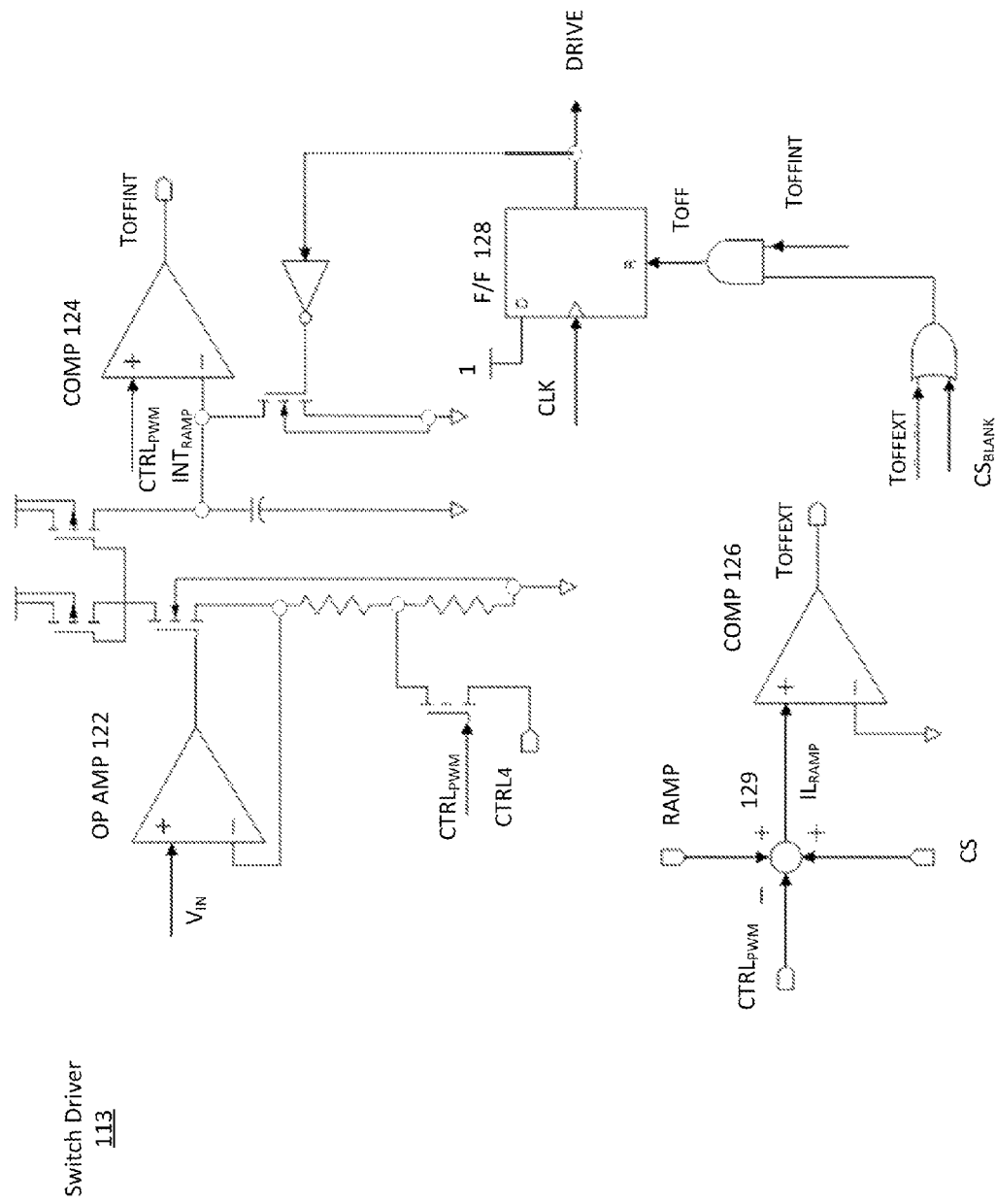
FIGS. 14 and 15 are used to illustrate details of the switch driver shown in FIG. 2, according to an alternative embodiment that employs a dual ramp operation.
Figure 15:
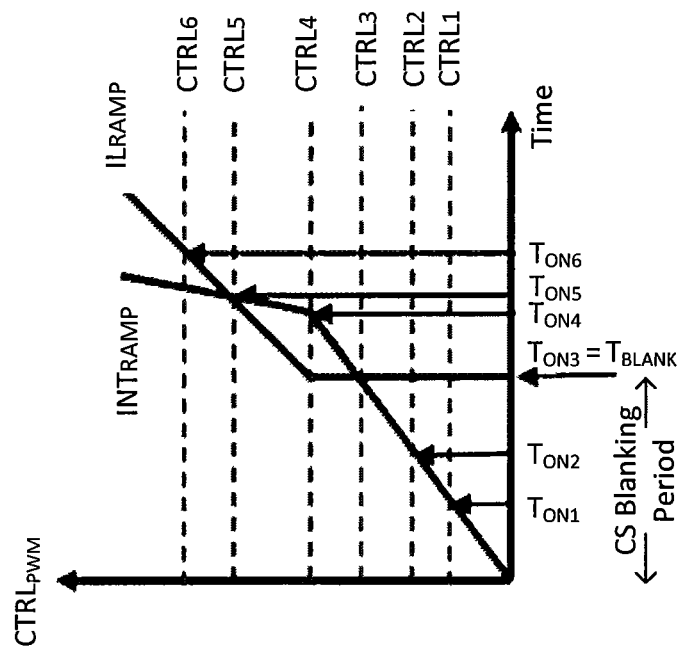

Referring to FIG. 15, in accordance with certain embodiments, the on-time is determined by an internal ramp ($INT_{RAMP}$) signal when $CTRL<CTRL_5$, and the on-time is determined by an external ramp ($EXT_{RAMP}$, also referred to as $IL_{RAMP}$) signal when $CTRL>CTRL_5$. FIG. 14 illustrates an embodiment of the switch driver 113 that generates the on-time ($T_{ON}$) versus CTRL characteristics shown in FIG. 15. In an embodiment, the drive terminating signal $T_{OFF}$ is determined by:

$$T_{OFF}=(T_{OFFEXT} \text{ or } CS_{BLANK}) \text{ and } (T_{OFFINT}).$$

Generating the $INT_{RAMP}$ signal from $V_{IN}$ (i.e., the input voltage) has the advantage that the slope of the ramp changes with input voltage, and thus, follows the change in slope of the $IL_{RAMP}$ signal.

Referring to FIG. 14, the $INT_{RAMP}$ signal is generated using a ramp generator that includes an operational amplifier 122, and a comparator 124 that generates $T_{OFFINT}$ in dependence on the $CTRL_{PWM}$, $INT_{RAMP}$ and DRIVE signals. A summing amplifier 129 generates the external ramp signal, which is $IL_{RAMP}$, by summing the slope compensation ramp signal RAMP and the voltage at the current sense CS and subtracting the PWM control voltage $CTRL_{PWM}$ from the sum. The comparator 126 generates $T_{OFFEXT}$ in dependence on the $IL_{RAMP}$ signal, which can also be referred to as the external ramp signal. Logic circuitry including an OR gate, an AND gate, and a D flip-flop 128 generate the DRIVE signal in dependence on the $T_{OFFEXT}$, $T_{OFFINT}$, CLK, and $CS_{BLANK}$ signals. Alternative implementations of the switch driver 113 are also possible, and within the scope of an embodiment.

It is also possible to measure the rate of change of external ramp ($IL_{RAMP}$) and adjust the rate of change of internal ramp ($INT_{RAMP}$), which has the added advantage that the rate of change of internal ramp tracks the rate of change of external ramp ($EXT_{RAMP}$) for component variation.

Advantages of the embodiments described with reference to FIGS. 14 and 15 are: a very low on-time minimum can be achieved as this would allow one to operate within the CS blanking period; the internal ramp slope is proportional with the input voltage; and at high currents the external ramp determines the peak current in inductor and thus tracks variations in inductor value.

Figure 16:
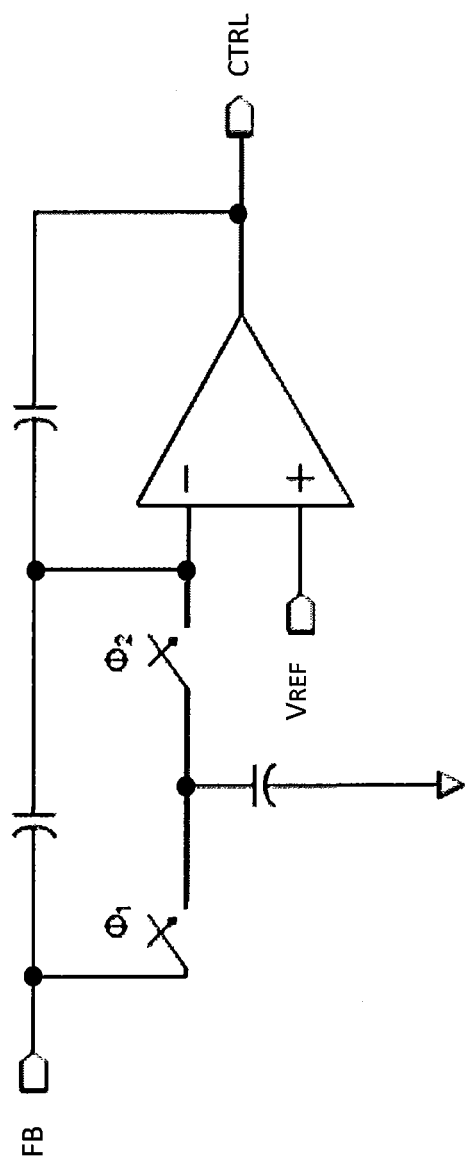
FIG. 16 illustrates an exemplary embodiment of the integrator and the controller shown in FIG. 2.

For completeness, FIG. 16 illustrates an exemplary embodiment of the integrator 110 and the controller 111, collectively, shown in FIG. 1. However, embodiments of the present invention are not limited to use of the circuit shown in FIG. 16. An advantage of using a switch capacitor implementation, as shown in FIG. 16, is that it is possible to move the poles and zeros of the system with the switching frequency and/or load variation, thus maintaining sufficient phase margin across different loads.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, while the DC-DC converter shown in FIG. 1 is an asynchronous boost type of DC-DC converter, embodiments described herein can also be used with other types of boost converters such as synchronous boost converter. In addition, embodiments described herein could also be used with other types of converters, such as, but not limited to, buck type of DC-DC converters, as would be appreciated by one of ordinary skill in the art. Referring briefly back to FIG. 1, the boost DC-DC converter 100 shown therein can be modified to be a buck DC-DC converter by rotating the positions of the inductor 101, the diode 102 and the power switch 103, as would be appreciated by one of ordinary skill in the art. Whether implemented as a boost or buck DC-DC converter, the DC-DC converter can be modified to be a synchronous type of converter by replacing the diode 102 with a switch, as would be appreciated by one of ordinary skill in the art.

Embodiments of the present invention are also directed to SMPS DC-DC converters that include one of the controllers 106 summarized above. Such a DC-DC converter can be a boost converter, e.g., as in FIG. 1, or a buck converter, but is not limited thereto.

Figure 17:
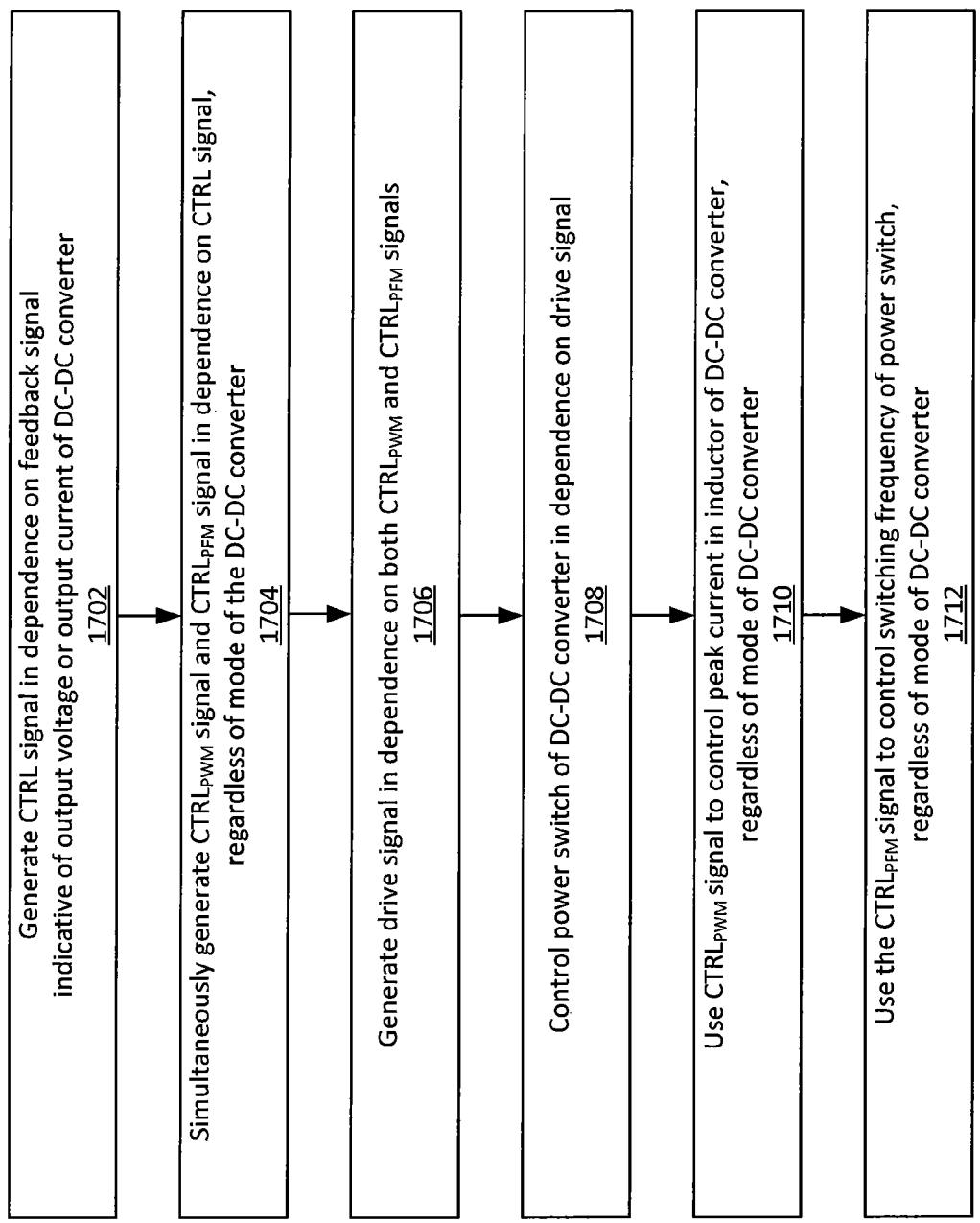
FIG. 17 is a high level flow diagram that is used to summarize methods according to various embodiments of the present invention.

Further, embodiments of the present invention are also directed to methods for use with a SMPS DC-DC converter. For example, referring to FIG. 17, such a method can include generating a control (CTRL) signal in dependence on a feedback signal that is indicative of an output voltage or output current of the DC-DC converter, as indicated at step 1702. Additionally, the method includes simultaneously generating a PWM control ($CTRL_{PWM}$) signal and a PFM control ($CTRL_{PFM}$) signal in dependence on the CTRL signal regardless of a mode of the DC-DC converter, as indicated at step 1704. Further, the method includes generating a drive signal (DRIVE) in dependence on both the $CTRL_{PWM}$ signal and the $CTRL_{PFM}$ signal, and controlling the power switch of the DC-DC converter in dependence on the drive signal, as indicated at step 1706 and 1708. The method can also include using the $CTRL_{PWM}$ signal to control a peak current in the inductor of the DC-DC converter, regardless of the mode of the DC-DC converter, and using the $CTRL_{PFM}$ signal to control a switching frequency of the power switch regardless of the mode of the DC-DC converter, as indicated at steps 1710 and 1712. Such a method can be used to ensure that there is no abrupt change in output power of the DC-DC converter, when the DC-DC converter transitions from one mode to another mode, and that the output power of the DC-DC converter changes monotonically with changes in the CTRL signal. Further, it is noted that the steps in FIG. 17 are not necessarily performed in the specific order shown, by rather, many steps summarized therein can be performed at the same time, as would be understood by one of ordinary skill in the art.

In certain embodiments, discussed above with reference to FIGS. 9 and 10, a method can include: operating the DC-DC converter in a PWM mode when CTRL is greater than a first threshold voltage $CTRL_1$; operating the DC-DC converter in a PFM mode when CTRL is greater than a second threshold voltage $CTRL_2$, and less than $CTRL_1$; operating the DC-DC converter in a PWM-PFM mode when CTRL is greater than a third threshold voltage $CTRL_3$, and less than $CTRL_2$; and operating the DC-DC converter in the PWM mode when CTRL is less than $CTRL_3$.

A method can also include adjusting the $CTRL_{PFM}$ signal monotonically in dependence on the CTRL signal, and maintaining the $CTRL_{PWM}$ signal at a substantially constant level, when the DC-DC converter is in the PFM mode. Further, the method can include adjusting the $CTRL_{PWM}$ signal monotonically in dependence on the CTRL signal, and maintaining the $CTRL_{PFM}$ signal at a substantially constant level, when the DC-DC converter is in the PWM mode. Additionally, the method can include adjusting both the $CTRL_{PFM}$ signal and the $CTRL_{PWM}$ signal monotonically in dependence on the CTRL signal when the DC-DC converter is in the PWM-PFM mode.

Additional details of such methods can be appreciated from the above discussion of FIGS. 1-16.

The breadth and scope of the present invention should not be limited by any of the above-described exemplary embodiments, but should be defined only in accordance with the following claims and their equivalents.

What is claimed is:

1. A controller for use with a switch mode power supply DC-DC converter including an inductor and a power switch and capable of operating in at least a PWM mode and a PFM mode, the controller comprising:
    a PWM/PFM generator that simultaneously generates a PWM control ($CTRL_{PWM}$) signal and a PFM control ($CTRL_{PFM}$) signal in dependence on a control (CTRL) signal; and
    a switch driver that generates a drive signal in dependence on both the $CTRL_{PWM}$ signal and the $CTRL_{PFM}$ signal;
    wherein the drive signal is used to control the power switch of the DC-DC converter;
    wherein the CTRL signal is generated in dependence on a feedback signal that is indicative of at least one of an output voltage or an output current of the DC-DC converter;
    wherein the $CTRL_{PWM}$ signal is used to control a peak current in the inductor regardless of whether the DC-DC converter is in the PFM mode or the PWM mode;
    wherein the $CTRL_{PFM}$ signal is used to control a switching frequency of the power switch regardless of whether the DC-DC converter is in the PFM mode or the PWM mode; and
    wherein the PWM/PFM generator is adapted to
        compare the CTRL signal to a threshold level $CTRL_1$ or a buffered version thereof;
        cause the $CTRL_{PWM}$ signal to be equal to the threshold level $CTRL_1$ during at least a portion of a period when the CTRL signal is less than the threshold level $CTRL_1$;
        cause the $CTRL_{PWM}$ signal to be greater than the threshold level $CTRL_1$ when the CTRL signal is greater than the threshold level $CTRL_1$;
        cause the $CTRL_{PFM}$ signal to be less than the threshold level $CTRL_1$ when the CTRL signal is less than the threshold level $CTRL_1$; and
        cause the $CTRL_{PFM}$ signal to be equal to the threshold level $CTRL_1$ during at least a portion of a period when the CTRL signal is greater than the threshold level $CTRL_1$.

2. The controller of claim 1, wherein the controller is configured to ensure that there is no abrupt change in the peak current in the inductor and no abrupt change in the switching frequency of the power switch, and thus, that there is no abrupt change in output power of the DC-DC converter, when the DC-DC converter transitions from one mode to another, and that the output power of the DC-DC converter changes monotonically with changes in the CTRL signal.

3. The controller of claim 1, wherein the PWM/PFM generator is adapted to:
    maintain the $CTRL_{PWM}$ signal at a substantially constant level and vary the $CTRL_{PFM}$ signal in dependence on the feedback signal when the DC-DC converter is in the PFM mode, and thereby cause the peak current in the inductor to remain substantially constant when the DC-DC converter is in the PFM mode; and
    maintain the $CTRL_{PFM}$ signal at a substantially constant level and vary the $CTRL_{PWM}$ signal in dependence on the feedback signal when the DC-DC converter is in the PWM mode, and thereby cause the switching frequency to remain substantially constant when the DC-DC converter is in the PWM mode.

4. The controller of claim 3, wherein the PWM/PFM generator is adapted to:
    vary both the $CTRL_{PFM}$ signal and the $CTRL_{PWM}$ signal in dependence on the feedback signal when the DC-DC converter is in a PWM-PFM mode, and thereby cause the switching frequency and the peak current in the inductor to both change when the DC-DC converter is in the PWM-PFM mode.

5. The controller of claim 1, wherein the PWM/PFM generator is adapted to:
    adjust the $CTRL_{PFM}$ signal monotonically in dependence on the CTRL signal, and maintain the $CTRL_{PWM}$ signal at a substantially constant level, when the CTRL signal is less than the threshold level $CTRL_1$; and
    adjust the $CTRL_{PWM}$ signal monotonically in dependence on the CTRL signal, and maintain the $CTRL_{PFM}$ signal at a substantially constant level, when the CTRL signal is greater than the threshold level $CTRL_1$.

6. The controller of claim 1, wherein threshold level $CTRL_1$ is a first threshold level, and wherein the PWM/PFM generator is adapted to:
    maintain the $CTRL_{PWM}$ signal at a substantially constant level when the CTRL signal is between the first threshold level $CTRL_1$ and a second threshold level $CTRL_2$;
    adjust the $CTRL_{PWM}$ signal monotonically in dependence on the CTRL signal when the CTRL signal is greater than the first threshold level $CTRL_1$;
    adjust the $CTRL_{PWM}$ signal monotonically in dependence on the CTRL signal when the CTRL signal is less than the second threshold level $CTRL_2$;

maintain the $CTRL_{PFM}$ signal at a substantially constant level, which corresponds to an approximately maximum switching frequency $F_{SWMAX}$, when the CTRL signal is greater than the first threshold level $CTRL_1$;

adjust the $CTRL_{PFM}$ signal monotonically in dependence on the CTRL signal when the CTRL signal is between the first threshold level $CTRL_1$ and a third threshold level $CTRL_3$; and maintain the $CTRL_{PFM}$ signal at a substantially constant level when the CTRL signal is less than the third threshold level $CTRL_3$;

wherein $CTRL_1 > CTRL_2 > CTRL_3$.

7. The controller of claim 6, wherein the controller causes the DC-DC converter to be:
in the PWM mode when $CTRL > CTRL_1$;
in the PFM mode when $CTRL_2 < CTRL < CTRL_1$;
in a PWM-PFM mode when $CTRL_3 < CTRL < CTRL_2$; and
in the PWM mode when $CTRL < CTRL_3$.

8. The controller of claim 6, wherein the third threshold level $CTRL_3$ specifies an approximately minimum switching frequency $F_{SWMIN}$, and thus, the third threshold level $CTRL_3$ can be selected to ensure that the approximately minimum switching frequency $F_{SWMIN}$ is above audible frequencies to thereby achieve audio suppression.

9. The controller of claim 1, wherein the PWM/PFM generator achieves audio band suppression by ensuring that the switching frequency of the DC-DC converter does not fall below a minimum switching frequency $F_{SWMIN}$ that is above audible frequencies.

10. The controller of claim 1, wherein the switch driver comprises:
a voltage controlled oscillator that generates a clock signal in dependence on the $CTRL_{PFM}$ signal;
circuitry that generates a drive terminating signal in dependence on the $CTRL_{PWM}$ signal; and
circuitry that generates the drive signal in dependence on the clock signal and the drive terminating signal.

11. The controller of claim 1, wherein the PWM/PFM generator includes:
a first multiplexer that receives at least two input signals and outputs one of the input signals as the $CTRL_{PWM}$ signal in dependence on a first select signal;
a second multiplexer that receives at least two input signals and outputs one of the input signals as the $CTRL_{PFM}$ signal in dependence on a second select signal; and
one or more comparators that generate the first and second select signals.

12. The controller of claim 1, wherein:
the switch driver includes a voltage controlled oscillator (VCO) that generates a clock signal in dependence on the $CTRL_{PFM}$ signal;
the switch driver uses the clock signal to generate the drive signal; and
gain of the VCO adjusts gain of the DC-DC converter and thereby adjusts a phase margin and bandwidth of the DC-DC converter to stabilize of the DC-DC converter.

13. The controller of claim 1, wherein the switch driver comprises:
circuitry that generates a clock signal in dependence on the $CTRL_{PFM}$ signal;
circuitry that generates a first drive terminating signal in dependence on the $CTRL_{PFM}$ signal;
circuitry that generates a second drive terminating signal in dependence on the $CTRL_{PWM}$ signal; and
circuitry that generates the drive signal in dependence on the first drive terminating signal, the second drive terminating signal, the clock signal, a current sense signal, and a current sense blanking signal;

wherein the current sense signal is generated by a current sense circuit of the DC-DC converter;

wherein the current sense blanking signal causes the current sense signal to not be generated, or to be ignored, during blanking periods; and wherein the clock signal controls the switching frequency of the DC-DC converter.

14. A switch mode power supply DC-DC converter capable of operating in a PWM mode and a PFM mode, comprising:
an inductor and a power switch;
a controller that produces a drive signal that controls the power switch;
wherein the controller includes
circuitry that generates a control (CTRL) signal independence on a feedback signal that is indicative of at least one of an output voltage or an output current of the DC-DC converter;
a PWM/PFM generator that simultaneously generates a PWM control ($CTRL_{PWM}$) signal and a PFM control ($CTRL_{PFM}$) signal in dependence on the CTRL signal; and
a switch driver that generates the drive signal in dependence on both the $CTRL_{PWM}$ signal and the $CTRL_{PFM}$ signal;
wherein the $CTRL_{PWM}$ signal is used to control a peak current in the inductor regardless of whether the DC-DC converter is in the PFM mode or the PWM mode;
wherein the $CTRL_{PFM}$ signal is used to control a switching frequency of the power switch regardless of whether the DC-DC converter is in the PFM mode or the PWM mode; and
wherein the PWM/PFM generator is adapted to
compare the CTRL signal to a threshold level $CTRL_1$ or a buffered version thereof;
cause the $CTRL_{PWM}$ signal to be equal to the threshold level $CTRL_1$ during at least a portion of a period when the CTRL signal is less than the threshold level $CTRL_1$;
cause the $CTRL_{PWM}$ signal to be greater than the threshold level $CTRL_1$ when the CTRL signal is greater than the threshold level $CTRL_1$;
cause the $CTRL_{PFM}$ signal to be less than the threshold level $CTRL_1$ when the CTRL signal is less than the threshold level $CTRL_1$; and
cause the $CTRL_{PFM}$ signal to be equal to the threshold level $CTRL_1$ during at least a portion of a period when the CTRL signal is greater than the threshold level $CTRL_1$.

15. The DC-DC converter of claim 14, wherein the controller is configured to ensure that there is no abrupt change in the peak current in the inductor and no abrupt change in the switching frequency of the power switch, and thus, that there is no abrupt change in output power of the DC-DC converter, when the DC-DC converter transitions from one mode to another, and that the output power of the DC-DC converter changes monotonically with changes in the CTRL signal.

16. The DC-DC converter of claim 14, wherein the PWM/PFM generator of the controller is adapted to:
adjust the $CTRL_{PFM}$ signal monotonically in dependence on the CTRL signal, and maintain the $CTRL_{PWM}$ signal at a substantially constant level, when the CTRL signal is less than the threshold level $CTRL_1$; and
adjust the $CTRL_{PWM}$ signal monotonically in dependence on the CTRL signal, and maintain the $CTRL_{PFM}$ signal at a substantially constant level, when the CTRL signal is greater than the threshold level $CTRL_1$.

17. The DC-DC converter of claim 14, wherein threshold level $CTRL_1$ is a first threshold level, and wherein the PWM/PFM generator of the controller is adapted to:
   maintain the $CTRL_{PWM}$ signal at a substantially constant level when the CTRL signal is between the first threshold level $CTRL_1$ and a second threshold level $CTRL_2$;
   adjust the $CTRL_{PWM}$ signal monotonically in dependence on the CTRL signal when the CTRL signal is greater than the first threshold level $CTRL_1$;
   adjust the $CTRL_{PWM}$ signal monotonically in dependence on the CTRL signal when the CTRL signal is less than the second threshold level $CTRL_2$;
   maintain the $CTRL_{PFM}$ signal at a substantially constant level, which corresponds to an approximately maximum switching frequency $F_{SWMAX}$, when the CTRL signal is greater than the first threshold level $CTRL_1$;
   adjust the $CTRL_{PFM}$ signal monotonically in dependence on the CTRL signal when the CTRL signal is between the first threshold level $CTRL_1$ and a third threshold level $CTRL_3$; and
   maintain the $CTRL_{PFM}$ signal at a substantially constant level when the CTRL signal is less than the third threshold level $CTRL_3$;
   wherein $CTRL_1 > CTRL_2 > CTRL_3$, and
   wherein the controller causes the DC-DC converter to be
   in a PWM mode when $CTRL > CTRL_1$,
   in a PFM mode when $CTRL_2 < CTRL < CTRL_1$,
   in a PWM-PFM mode when $CTRL_3 < CTRL < CTRL_2$, and
   in the PWM mode when $CTRL < CTRL3$.

18. A method for use with a switch mode power supply DC-DC converter having an inductor and a power switch, the method comprising:
   generating a control (CTRL) signal in dependence on a feedback signal that is indicative of at least one of an output voltage or an output current of the DC-DC converter;
   simultaneously generating a PWM control ($CTRL_{PWM}$) signal and a PFM control ($CTRL_{PFM}$) signal in dependence on the CTRL signal regardless of a mode of the DC-DC converter;
   generating a drive signal in dependence on both the $CTRL_{PWM}$ signal and the $CTRL_{PFM}$ signal;
   controlling the power switch of the DC-DC converter in dependence on the drive signal;
   using the $CTRL_{PWM}$ signal to control a peak current in the inductor regardless of the mode of the DC-DC converter; and
   using the $CTRL_{PFM}$ signal to control a switching frequency of the power switch independent of the $CTRL_{PWM}$ signal and regardless of the mode of the DC-DC converter;
   wherein the simultaneously generating the $CTRL_{PWM}$ signal and the $CTRL_{PFM}$ signal comprises
      comparing the CTRL signal to a threshold level $CTRL_1$ or a buffered version thereof;
      causing the $CTRL_{PWM}$ signal to be equal to the threshold level $CTRL_1$ during at least a portion of a period when the CTRL signal is less than the threshold level $CTRL_1$,
      causing the $CTRL_{PWM}$ signal to be greater than the threshold level $CTRL_1$ when the CTRL signal is greater than the threshold level $CTRL_1$,
      causing the $CTRL_{PFM}$ signal to be less than the threshold level $CTRL_1$ when the CTRL signal is less than the threshold level $CTRL_1$, and
      causing the $CTRL_{PFM}$ signal to be equal to the threshold level $CTRL_1$ during at least a portion of a period when the CTRL signal is greater than the threshold level $CTRL_1$.

19. The method of claim 18, further comprising:
   ensuring that there is no abrupt change in the peak current in the inductor and no abrupt change in the switching frequency of the power switch, and thus, that there is no abrupt change in output power of the DC-DC converter, when the DC-DC converter transitions from one mode to another mode, and that output power of the DC-DC converter changes monotonically with changes in the CTRL signal.

20. The method of claim 18, wherein threshold level $CTRL_1$ is a first threshold level, and further comprising:
   operating the DC-DC converter in a PWM mode when the CTRL signal is greater than the first threshold level $CTRL_1$;
   operating the DC-DC converter in a PFM mode when the CTRL signal is greater than a second threshold level $CTRL_2$, and less than the first threshold level $CTRL_1$;
   operating the DC-DC converter in a PWM-PFM mode when the CTRL signal is greater than a third threshold level $CTRL_3$, and less than the second threshold level $CTRL_2$; and
   operating the DC-DC converter in the PWM mode when the CTRL signal is less than the third threshold level $CTRL_3$.

21. The method of claim 20, further comprising:
   adjusting the $CTRL_{PFM}$ signal monotonically in dependence on the CTRL signal, and maintaining the $CTRL_{PWM}$ signal at a substantially constant level, when the DC-DC converter is in the PFM mode;
   adjusting the $CTRL_{PWM}$ signal monotonically in dependence on the CTRL signal, and maintaining the $CTRL_{PFM}$ signal at a substantially constant level, when the DC-DC converter is in the PWM mode; and
   adjusting both the $CTRL_{PFM}$ signal and the $CTRL_{PWM}$ signal monotonically in dependence on the CTRL signal when the DC-DC converter is in the PWM-PFM mode.

22. The controller of claim 1, wherein:
   the controller generates an internal ramp ($INT_{RAMP}$) signal and an external ramp ($IL_{RAMP}$) signal;
   the switch driver controls an on-time $T_{ON}$ associated with the drive signal;
   the switch driver generates the drive signal also in dependence on a current sense (CS) signal indicative of a current in the inductor while the power switch is closed;
   the CS signal is not generated, or is ignored, during a current sense (CS) blanking period corresponding to when the on-time $T_{ON}$ is below a blanking threshold $T_{BLANK}$;
   the $INT_{RAMP}$ signal is used to monotonically adjust the on-time $T_{ON}$ during the blanking period corresponding to when the on-time $T_{ON}$ is below a blanking threshold $T_{BLANK}$; and
   at least one of the $INT_{RAMP}$ or the $IL_{RAMP}$ signal is used to monotonically adjust the on-time $T_{ON}$ when the on-time $T_{ON}$ is above the blanking threshold $T_{BLANK}$.

* * * * *

UNITED STATES PATENT AND TRADEMARK OFFICE
CERTIFICATE OF CORRECTION

PATENT NO.        : 9,337,726 B2                                                   Page 1 of 1
APPLICATION NO.   : 14/069637
DATED             : May 10, 2016
INVENTOR(S)       : Lalithambika et al.

It is certified that error appears in the above-identified patent and that said Letters Patent is hereby corrected as shown below:

In the claims,

Column 15, line 26 (claim 17, line 24):   Please change "$_3$," to -- $_3$; --

Column 15, line 62 (claim 18, line 30):   Please change "$_1$," to -- $_1$; --

Column 15, line 65 (claim 18, line 33):   Please change "$_1$," to -- $_1$; --

Column 16, line 3 (claim 18, line 36):    Please change "$_1$," to -- $_1$; --

Signed and Sealed this
Nineteenth Day of July, 2016

Michelle K. Lee
*Director of the United States Patent and Trademark Office*